(12) United States Patent
Onitake et al.

(10) Patent No.: US 8,899,396 B2
(45) Date of Patent: Dec. 2, 2014

(54) CLUTCH DEVICE

(71) Applicants: JTEKT Corporation, Osaka (JP); Toyota Jidosha Kabushiki Kaisha, Toyota (JP)

(72) Inventors: Minoru Onitake, Kariya (JP); Hiroshi Takuno, Nukata-gun (JP); Takashi Hosokawa, Takahama (JP); Kenji Korenaga, Anjo (JP)

(73) Assignees: JTEKT Corporation, Osaka-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 155 days.

(21) Appl. No.: 13/650,630

(22) Filed: Oct. 12, 2012

(65) Prior Publication Data
US 2013/0092502 A1    Apr. 18, 2013

(30) Foreign Application Priority Data
Oct. 13, 2011  (JP) ................. 2011-226014

(51) Int. Cl.
*F16D 27/112* (2006.01)
*F16D 23/12* (2006.01)

(52) U.S. Cl.
CPC ........ *F16D 27/112* (2013.01); *F16D 2023/123* (2013.01)
USPC ......................... 192/84.7; 188/156

(58) Field of Classification Search
None
See application file for complete search history.

(56) References Cited

U.S. PATENT DOCUMENTS 4,079,821 A    3/1978  Miller
8,469,859 B2 *  6/2013  Kimura et al. ............... 477/5

FOREIGN PATENT DOCUMENTS

| FR | 2 352 212 A1 | 12/1977 |
| JP | 2003-254352 | 9/2003 |
| JP | 2005-263208 | 9/2005 |
| JP | 2010-208584 | 9/2010 |
| JP | 2011-144835 A | 7/2011 |
| WO | WO 2010/119551 A1 * | 10/2010 |

OTHER PUBLICATIONS

Extended European Search Report issued Jul. 9, 2014 in Patent Application No. 12188103.1.

* cited by examiner

*Primary Examiner* — Rodney H Bonck
(74) *Attorney, Agent, or Firm* — Oblon, Spivak, McClelland, Maier & Neustadt, L.L.P.

(57) ABSTRACT

A clutch device includes; i) a clutch mechanism including a friction engagement member capable of rotating relative to a rotating member and a clutch member that is supplied with restoration force in a direction in which the clutch member departs from the friction engagement member by a restoration spring; and ii) a cam mechanism including; a cam member that is arranged in parallel to the clutch mechanism along a rotation axis line of the rotating member and that is incapable of rotating relative to the rotating member; and a cam follower capable of rolling on a cam surface that exists between the cam member and the clutch member. The cam angle is set to make torque applied to the clutch member due to reaction force accompanied by friction engagement with the friction engagement member larger than torque applied to the clutch member by thrust force caused by an activation of the cam mechanism.

4 Claims, 4 Drawing Sheets

CLUTCH DEVICE

INCORPORATION BY REFERENCE

The disclosure of Japanese Patent Application No. 2011-226014 filed on Oct. 13, 2011 including the specification, drawings and abstract is incorporated herein by reference in its entirety.

BACKGROUND OF THE INVENTION

1. Field of the Invention

The present invention relates to a clutch device which is preferable when used as an electromagnetic clutch for controlling transmission of torque between rotating members or braking of the rotating members.

2. Description of Related Art

There has been known a braking mechanism in which rotation of the rotating members is restricted by a clutch controlled by excitation of an electromagnetic coil (see Japanese Patent Application Publication No. 2010-208584 (JP 2010-208584 A), for example)

The braking mechanism disclosed in JP 2010-208584 A includes a cam member which is rotated by a rotating member, a clutch plate arranged such that it is opposed to the cam member, cam balls interposed between the cam member and the clutch plate, an actuator which generates friction torque in the clutch plate and a return spring for generating urging force which separates the clutch plate from the actuator. The actuator includes an electromagnetic coil, a suction portion which accommodates the electromagnetic coil, and a frictional portion which is formed in the suction portion and makes frictional contact with the clutch plate.

When the electromagnetic coil is excited upon rotation of the rotating member and the clutch plate is brought into contact with the frictional portion due to its generated electromagnetic force, differential rotation is generated between the cam member and the clutch plate, so that this differential rotation generates cam thrust force with the cam balls. Due to this cam thrust force, the clutch plate is pressed against the frictional portion strongly so that the friction force between the clutch plate and the frictional portion is further increased. As a result, the braking mechanism turns into self-locking state, so that even if excitation of the electromagnetic coil is stopped after that, contact state between the clutch plate and the frictional portion is kept. That is, the braking mechanism is constructed in the form of a self-lock clutch.

In such a self-lock clutch, if it turns into an erroneous locking state in which it undergoes the self-locking due to some reason including vibration, the erroneous locking state is never released until the torque applied to the rotating member becomes smaller than a predetermined value. Thus, some fail safe operation is necessary. For example, a hybrid vehicle described in JP 2010-208584 A is so constructed that when the erroneous locking state occurs, supply of fuel to an engine is stopped and at the same time, a braking system is controlled to lower the velocity of the vehicle.

By the way, to prevent occurrence of the above-described erroneous locking state, it can be considered to increase the urging force of the return spring and then release the self-locking state with this urging force. However, if the urging force of the return spring is increased, a large electromagnetic force for activating the clutch correspondingly is required, thereby leading to increase in size of the electromagnetic coil or increase in consumption power. Further, depending on a magnitude of a torque applied to the rotating member, the self-locking state may not be released successfully by the urging force of the return spring.

SUMMARY OF THE INVENTION

The present invention provides a clutch device capable of preventing occurrence of a self-locking state.

An aspect of the present invention relates to a clutch device. The clutch device includes: i) a clutch mechanism including a friction engagement member capable of rotating relative to a rotating member and a clutch member that is supplied with restoration force in a direction in which the clutch member departs from the friction engagement member by a restoration spring; and ii) a cam mechanism including; a cam member that is incapable of rotating relative to the rotating member; and a cam follower capable of rolling on a cam surface that exists between the cam member and the clutch member. The cam member and the clutch mechanism are arranged in a row along a rotation axis line of the rotating member. The cam mechanism is configured so that a cam angle of the cam surface is set to an angle that makes torque applied to the clutch member due to reaction force accompanied by friction engagement with the friction engagement member side larger than torque applied to the clutch member by thrust force caused by activation of the cam mechanism.

In the clutch device, the cam mechanism may be configured so that the cam angle is set to an angle that satisfies $\mu m \times rm \times F < F \times rc \times (\sin\theta - \mu c \cos\theta)/(\cos\theta + \mu c \sin\theta)$, where the thrust force and the reaction force are F, the coefficient of static friction of the clutch member to a friction surface of the friction engagement member is $\mu m$, the coefficient of rolling friction of the cam follower to the clutch member is $\mu c$, the radius of an equivalent friction circle of the clutch member is rm, the radius of an action circle of the cam follower is rc, and the cam angle is $\theta$.

In the clutch device, the cam mechanism may be configured so that the cam angle is set to an angle that satisfies $0 < \mu c \leq 0.02$.

In the clutch device, the friction engagement member may be a coil housing. The clutch member may be an armature. The clutch mechanism may be an output mechanism including the coil housing, an electromagnetic coil accommodated in the coil housing, and the armature.

According to the above aspect of the present invention, it is possible to prevent occurrence of self-locking state.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments

Hereinafter, an electromagnetic clutch as a clutch device according to an embodiment of the present invention will be described in detail with reference to the accompanying drawings.

Entire Structure of Electromagnetic Clutch

Figure 1:
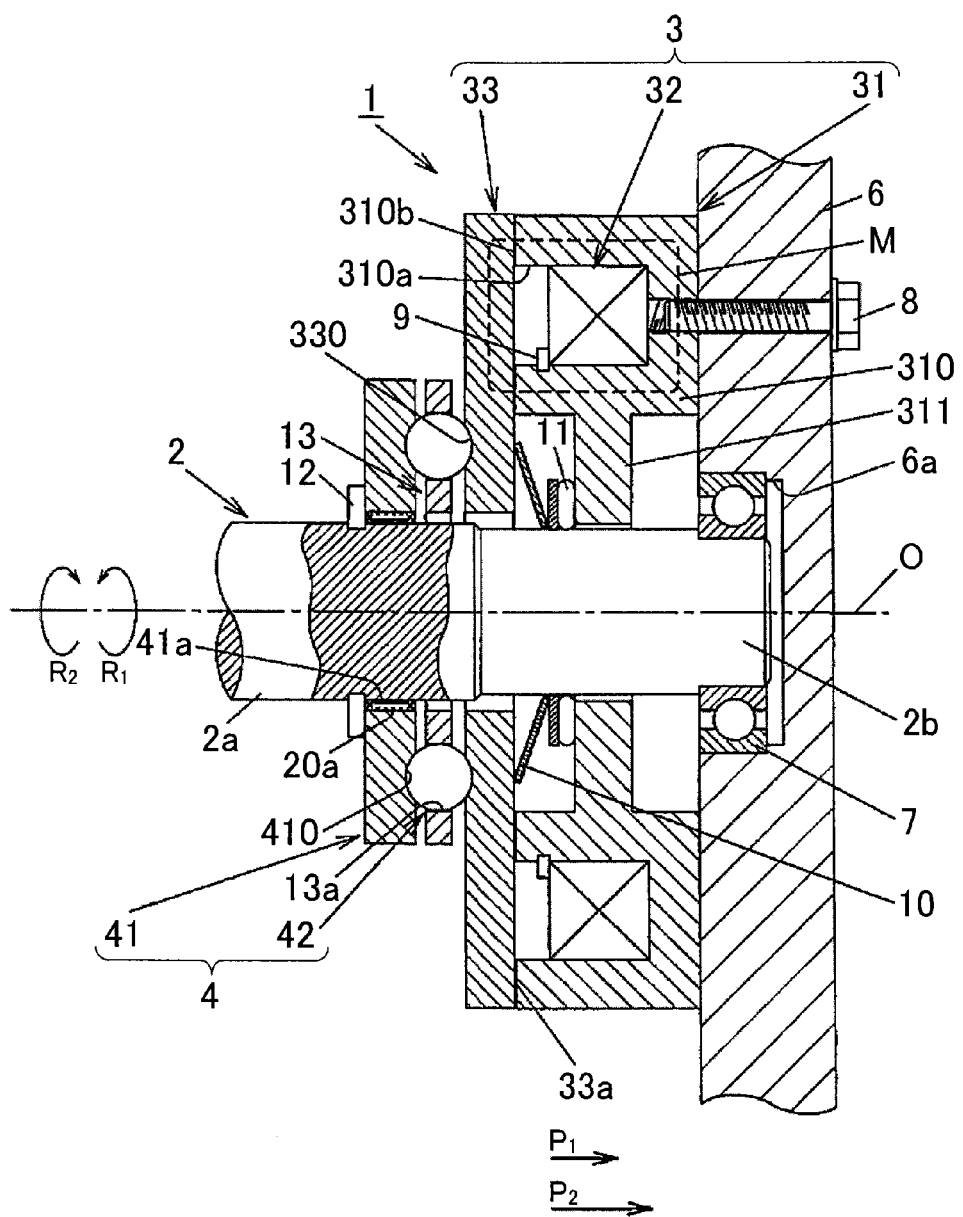
FIG. 1 is a cross-sectional view illustrating a drive status of an electromagnetic clutch as a clutch device according to an embodiment of the present invention.
Figure 2:
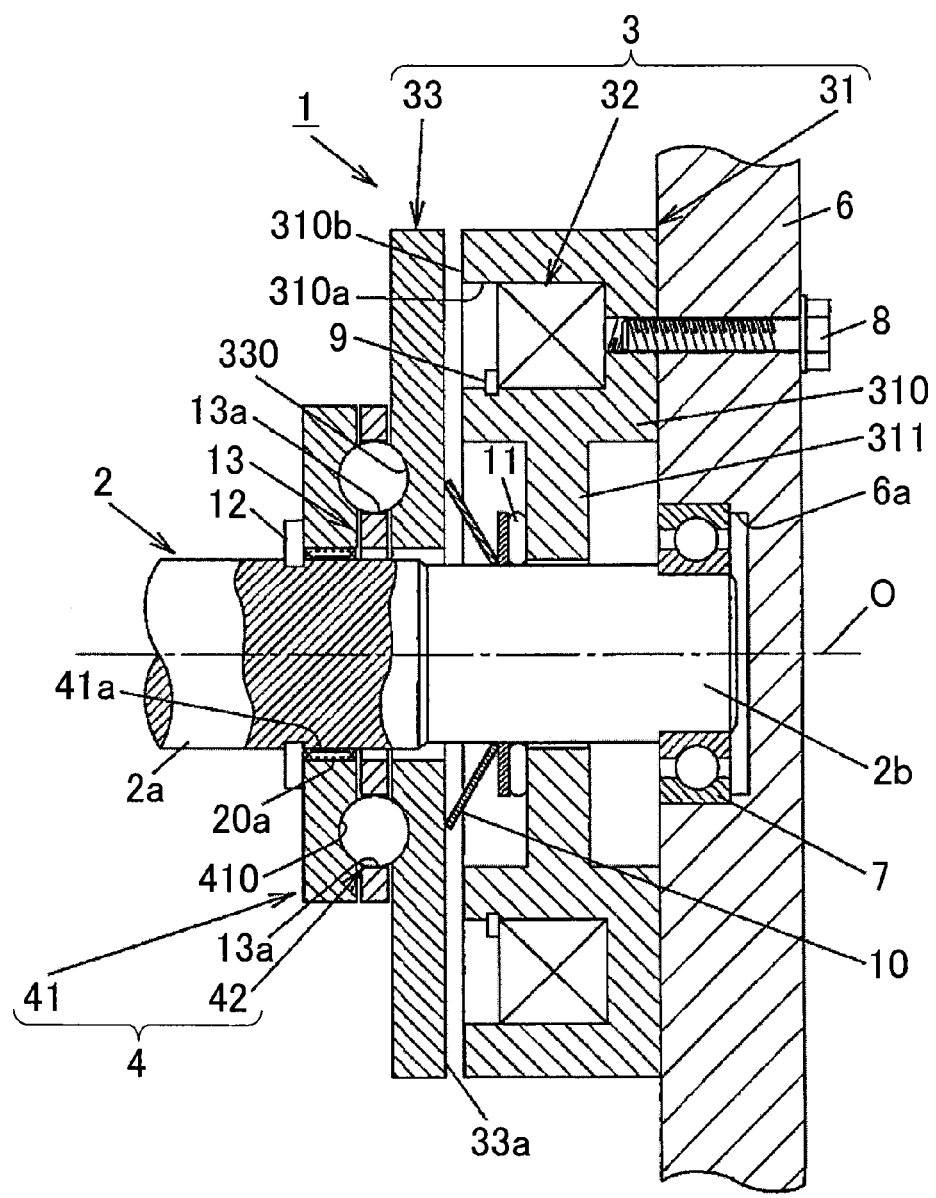
FIG. 2 is a cross-sectional view illustrating a non-drive status of the electromagnetic clutch as a clutch device according to the embodiment of the present invention.

FIG. 1 illustrates a drive status of the electromagnetic clutch, and FIG. 2 illustrates a non-drive status of the electromagnetic clutch. As illustrated in FIGS. 1 and 2, the electromagnetic clutch 1 is constituted of mainly a rotating member 2 which is rotated together with an input axis (not illustrated), an output mechanism 3 which is arranged on a rotation axis line O of the rotating member 2 as a clutch mechanism, and a cam mechanism 4 which is operated by an output of the output mechanism 3 to convert a rotation force from the rotating member 2 to a thrust force in a direction of the rotation axis line O.

The electromagnetic clutch 1 functions as a braking device for braking the rotating member 2 with respect to a casing 6 which serves as a non-rotating member and is used, for example, when switching a torque transmission path by means of a planetary gear system (not illustrated). The casing 6 is provided with a shaft hole 6a which is open in an inner surface thereof.

Structure of Rotating Member 2

The rotating member 2 is constituted of a solid round shaft including two large and small body portions 2a, 2b each having a different outside diameter from each other, connected to a motor shaft (input shaft) of an electric motor (not illustrated) via a reduction gear mechanism (not illustrated), and supported rotatably by the shaft hole 6a (only one side illustrated) in the casing 6 via a bearing 7.

The rotating member 2 is constructed to be rotated together with the input shaft by driving of the electric motor.

The large-diameter body portion 2a has a straight spline-fitting portion 20a, which is located on one side (electric motor side) of the rotating member 2. The small-diameter body portion 2b is arranged on the other side (casing 6 side) of the rotating member 2 and is consecutive from the large-diameter body portion 2a.

Structure of Output Mechanism 3

The output mechanism 3 includes a coil housing 31 which is a friction engagement member capable of rotating relative to the rotating member 2, an electromagnetic coil 32 for generating electromagnetic force within the coil housing 31, and an armature 33 which is a clutch member which is moved when the electromagnetic coil 32 is powered. The output mechanism 3 is arranged around the outer periphery of the rotating member 2.

The output mechanism 3 generates electromagnetic force as pressing force P1 to the coil housing 31 using the electromagnetic coil 32 and outputs a moving force to move the armature 33.

The coil housing 31 includes a coil holder 310 and an internal flange 311 which serve as a yoke, and is formed of an annular member which is fixed to the casing 6 with a fitting bolt 8 and through which the rotating member 2 passes.

The coil holder 310 has an annular coil accommodation portion 310a which is open to the armature 33 side and arranged in the outer periphery of the coil housing 31. The coil holder 310 has a friction face 310b which is oriented to an end face on the coil housing 31 side of the armature 33.

The internal flange 311 is disposed in the inner periphery side of the coil housing 31 and formed integrally with the inner peripheral face of the coil holder 310.

The electromagnetic coil 32 is accommodated in the coil accommodation portion 310a of the coil housing 31 such that it is opposed to the armature 33 and stopped from being loose by a retaining ring 9. Then, the electromagnetic coil 32 is so constructed to form an electromagnetic circuit M across the armature 33 and the coil housing 31 when powered.

The armature 33 has a friction face 33a opposed to the friction face 310b of the coil housing 31 and is arranged on the side of the cam mechanism 4 of the output mechanism 3 such that it is capable of rotating and moving relative to the rotating member 2. The armature 33 is formed entirely of an annular member through which the rotating member 2 passes.

Then, the armature 33 is moved in the direction of the axis line by an output of the output mechanism 3 so that the friction face 33a gets into a frictional engagement with the friction face 310b of the coil housing 31 due to the pressing force P1.

The armature 33 has a cam groove 330 which is open in an end face opposite to the end face on the coil housing side of the output mechanism 3 and functions as a component of the cam mechanism 4 together with a control cam 41 (described below) and a cam follower 42 (described below). Through cam action by activation of the cam mechanism 4, the friction face 33a gets into friction engagement with the friction face 310b of the coil housing 31 with a pressing force P2 larger than the pressing force P1 (P1<P2). The cam groove 330 is formed such that the depth thereof in the direction of the axis line changes along the circumference of the armature 33.

The armature 33 is always supplied with restoration force in a direction in which the armature 33 departs (separates) from the electromagnetic coil 32 by a restoration spring 10. The restoration spring 10 is formed of, for example, a disc spring and interposed between a bearing 11 on the coil housing 31 (internal flange 311) and the armature 33 while arranged around the outer periphery of the rotating member 2.

Structure of Cam Mechanism 4

The cam mechanism 4 has the control cam 41 which serves as a cam member and the cam follower 42 which is interposed between the control cam 41 and the armature 33 and is arranged around the outer periphery of the rotating member 2.

The control cam 41 has a straight-spline-fitting portion 41a which corresponds to the straight-spline-fitting portion 20a in the rotating member 2. The control cam 41 is arranged on the large-diameter body portion 2a of the rotating member 2 on the electric motor side of the cam mechanism 4 such that it is incapable of rotating relative to the large-diameter body portion 2a and capable of moving relative thereto. Additionally, the control cam 41 is restricted from moving in one direction of the axis line (to the electric motor) by a retaining ring 12.

The control cam 41 is provided with a cam groove 410 which is open to the cam follower 42 side. The cam groove 410 is formed of a concave groove whose depth in the direction of the axis line changes along the circumference of the control cam 41.

The cam follower 42 is formed of a spherical member and interposed between the cam groove 410 in the control cam 41 and the cam groove 330 in the armature 33 such that it is capable of rolling. The cam follower 42 is held by a retainer 13. The retainer 13 is provided with a ball holding hole 13a for holding the cam follower 42 such that it is capable of rolling.

Figure 3:
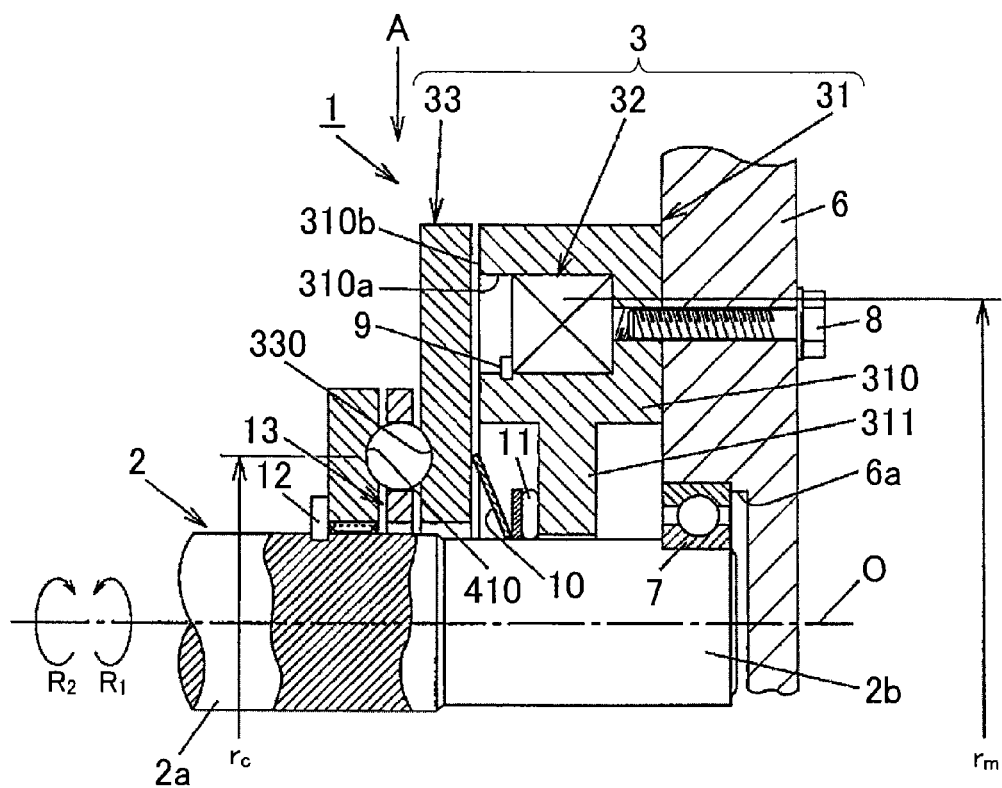
FIG. 3 is a cross-sectional view illustrating a generation status of rolling friction force of a cam follower in the electromagnetic clutch as a clutch device according to the embodiment of the present invention.
Figure 4:
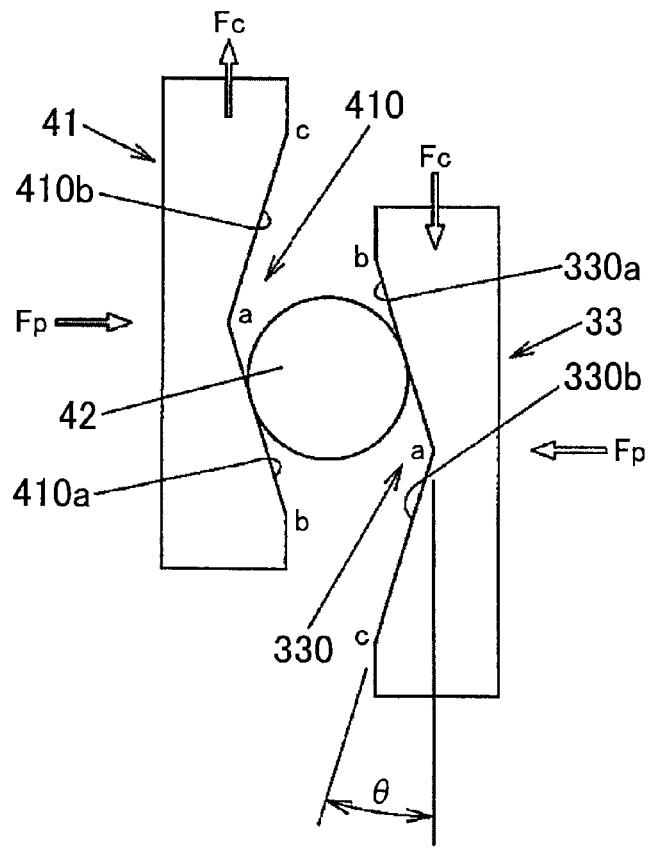
FIG. 4 is a view taken along an arrow A in FIG. 3.

Next, the cam groove 330 in the armature 33 and the cam groove 410 in the control cam 41 will be described with reference to FIGS. 3 and 4. FIG. 3 illustrates an operating condition of the cam mechanism. FIG. 4 illustrates each cam groove in the armature and the control cam. As illustrated in FIGS. 3 and 4, the cam groove 330 is formed of a concave groove whose depth in the direction of the axis line of the armature 33 decreases gradually from a central portion a in the circumferential direction where the depth is the largest toward end portions b, c in the circumferential direction. The groove bottom is formed of a cam surface 330a, existing between the central portion a in the circumferential direction and the end portion b in the circumferential direction, and a cam surface 330b existing between the central portion a in the circumferential direction and the end portion c in the circumferential direction.

When the electromagnetic coil 32 is not powered, the cam follower 42 is disposed in the central portion a in the circumferential direction of the cam groove 330. When rotating the control cam 41 relative to the armature 33 in a direction of an arrow R1 in a range between the central portion a in the circumferential direction of the cam groove 330 and the end portion b in the circumferential direction or rotating the control cam 41 relative to the armature 33 in a direction of an arrow R2 (opposite to the direction of the arrow R1) in a range between the central portion a in the circumferential direction of the cam groove 330 and the end portion c in the circumferential direction, the cam follower 42 rolls so that torsional force Fc is applied to the armature 33.

Cam surfaces 330a, 330b are formed of a slope having a cam angle θ (an inclination angle θ with respect to a plane perpendicular to the rotation axis line O) which rises from the central portion a in the circumferential direction toward the end portions b, c in the circumferential direction (such that the thickness of the armature 33 increases in the width direction of the armature 33 from the central portion a in the circumferential direction toward the end portions b, c in the circumferential direction).

Likewise, the cam groove 410 is formed of a concave groove whose depth in the direction of the axis line of the control cam 41 decreases gradually from the central portion a in the circumferential direction where the depth is the largest toward the end portions b, c in the circumferential direction. The groove bottom is formed of a cam surface 410a existing between the central portion a in the circumferential direction and the end portion b in the circumferential direction and a cam surface 410b existing between the central portion a in the circumferential direction and the end portion c in the circumferential direction.

When the electromagnetic coil 32 is not powered, the cam follower 42 is disposed in the central portion a in the circumferential direction of the cam groove 410. When rotating the control cam 41 relative to the armature 33 in a direction of an arrow R1 in a range between the central portion a in the circumferential direction of the cam groove 410 and the end portion b in the circumferential direction or rotating the control cam 41 relative to the armature 33 in a direction of an arrow R2 in a range between the central portion a in the circumferential direction of the cam groove 410 and the end portion c in the circumferential direction, the cam follower 42 rolls so that the torsional force Fc is applied to the control cam 41.

Cam surfaces 410a, 410b are formed of a slope having a cam angle θ (an inclination angle θ with respect to a plane perpendicular to the rotation axis line O) which rises from the central portion a in the circumferential direction toward the end portions b, c in the circumferential direction (such that the thickness of the control cam 41 increases in the width direction of the control cam 41 from the central portion a in the circumferential direction toward the end portions b, c in the circumferential direction).

The cam angle θ is set to such an angle that intensifies torque T2 (T1<T2: not indicated) applied to the armature 33 with reaction force Fp accompanying the friction engagement with the electromagnetic coil 32 with respect to the torque T1 (not indicated) applied to the armature 33 due to the thrust force F caused by activation of the cam mechanism 4. That is, assuming that the thrust force generated in the armature 33 due to the activation of the cam mechanism 4 is F, its reaction force is Fp (F=Fp), the coefficient of static friction of the armature 33 to the friction face 310b of the electromagnetic coil 32 is μm (e.g., μm≈0.1 to 0.15), the coefficient of rolling friction of the cam follower 42 to the armature 33 is μc (e.g., 0<μc≤0.02), the radius of an equivalent friction circle of the armature 33 is rm, and the radius of an action circle of the cam follower 42 is rc, it comes that the cam angle θ is set to such an angle that satisfies T1(T1>0.7×T2)=μm×rm×F<F×rc×(sin θ−μc cos θ)/(cos θ+μc sin θ)=T2.

Figure 5:
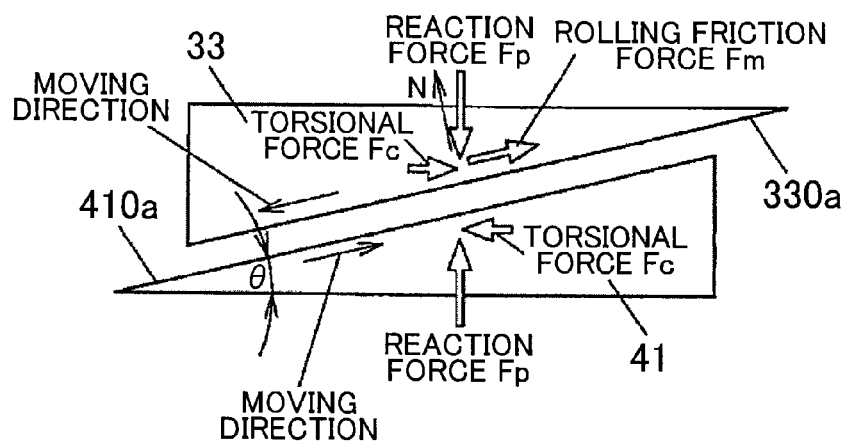
FIG. 5 is a cross-sectional view schematically illustrated to introduce a conditional equation for setting a desired cam angle in FIGS. 3 and 4.

The above-mentioned torque T2 can be obtained as follows using FIGS. 3 to 5. FIG. 5 illustrates a state in which the torsional force Fc is applied to the armature 33 when supply of electricity to the electromagnetic coil 32 is stopped.

Assuming that normal force applied to the cam surface 330a of the armature 33 when the cam follower 42 rolls is N in FIG. 5, it comes that Fc=−N sin θ+μN cos θ, Fp=−N cos θ−μN sin θ. Deleting the normal force N with these two equations, it comes that Fc=Fp×(sin θ−μ cos θ)/(cos θ+μ sin θ). As a result, it comes the T2=rc×Fc=Fp×rc×(sin θ−μ cos θ)/(cos θ+μ sin θ)=F×rc×(sin θ−μ cos θ)/(cos θ+μ sin θ).

According to the present embodiment, while securing the self-release characteristic of the armature 33 that when supply of electricity to the electromagnetic coil 32 is stopped, the armature 33 is separated from the electromagnetic coil 32 by means of the restoration spring 10, the coefficient of rolling friction of the cam follower 42 to the armature 33 is μc, the cam angle θ of the cam surface 330a can be set using a coefficient of rolling friction of μc=0.02 obtained from a result of an experiment and the thrust force F (transmission torque capacity) due to activation of the cam mechanism 4 can be increased to a possible extent.

Consequently, by setting the cam angle θ of the cam surface 330a to an extremely large angle in order to secure the self-release characteristic of the armature 33, it is possible to avoid a design based on estimating the transmission torque capacity to be lower than required.

Operation of Electromagnetic Clutch 1

Next, an operation of the electromagnetic clutch according to the present embodiment will be described with reference to FIGS. 1 to 5.

Referring to FIG. 2, when the electric motor (not illustrated) is driven, rotation drive force of the electric motor is transmitted to the rotating member 2 via the reduction gear mechanism (not illustrated) to rotate the rotating member 2.

Because when the electric motor is started, usually the electromagnetic coil 32 of the output mechanism 3 is supplied with no electricity, no magnetic circuit M originating from the electromagnetic coil 32 is formed. Thus, the armature 33 is never attracted to the electromagnetic coil 32 via the coil housing 31.

Thus, no pressing force P1 which turns to a clutch force in the output mechanism 3 is generated, so that the friction face 33a of the armature 33 and the friction face 310b of the coil holder 310 never get into friction engagement with each other. Consequently, no braking force by the electromagnetic clutch 1 is transmitted to the rotating member 2.

On the other hand, when the electromagnetic coil 32 is powered when driving the electric motor (when the rotating member 2 is rotating), the magnetic circuit M is formed from the electromagnetic coil 32, so that the armature 33 is moved from its initial position toward the coil holder 310 in the coil housing 31.

Consequently, as illustrated in FIG. 1, the friction face 33a of the armature 33 gets into friction engagement with the friction face 310b of the coil holder 310 with the pressing force P1, and accompanied by this phenomenon, the cam mechanism 4 is activated.

When the cam mechanism 4 is activated, due to the cam action caused by the activation, the friction face 33a of the armature 33 gets into stronger friction engagement with the friction face 310b of the coil holder 310 with the pressing force P2 (P1<P2) than before the cam mechanism 4 is started, so that braking force by the electromagnetic clutch 1 is transmitted to the rotating member 2.

When supply of electricity to the electromagnetic coil 32 is stopped when driving the electric motor, as illustrated in FIG. 3, the armature 33 is separated from the coil housing 31 by a spring force of the restoration spring 10. However, because the torque from the rotating member 2 remains being input to the control cam 41, the cam mechanism 4 is activated by the torsional force Fc (illustrated in FIG. 4) applied to the control cam 41 and the armature 33, so that the thrust force F is applied to the armature 33. Accompanied by this phenomenon, the armature 33 gets into friction engagement with the coil housing 31 with the thrust force F. At the same time, the reaction force Fp (Fp=F) is applied from the coil housing 31 to the armature 33, so that the rolling friction force Fm (indicated in FIG. 5) is generated between the armature 33 and the cam follower 42.

According to the present embodiment, the cam angle θ of each of the cam surfaces 330a, 330b of the armature 33 and the cam surfaces 410a, 410b of the control cam 41 is set to such an angle that satisfies μm×rm×F<F×rc×(sin θ−μc cos θ)/(cos θ+μc sin θ) in order to smooth the rolling of the cam follower 42. Therefore, the rolling of the cam follower 42 on the cam surfaces 330a, 330b, 410a, 410b is never obstructed. This phenomenon has been verified by a number of experiments.

Advantage of the Embodiment

According to the above-described embodiment, following advantages are obtained.

(1) T1 (friction torque applied to the armature by the cam thrust force) is set smaller than T2 (torque applied to the armature by the reaction force). Therefore, when the electromagnetic coil 32 is not powered, the electromagnetic clutch 1 is securely released thereby generating no self-locking state.

(2) Because the thrust force of the cam mechanism can be increased as much as possible with a condition for the self-release characteristic of the armature satisfied, it is possible to avoid restricting of the clutch device capacity excessively. That is, because the cam thrust force decreases when the cam angle is increased, a countermeasure such as increasing the size of the clutch device and increasing coil current is necessary to compensate for a decrease in the cam thrust force. According to the present embodiment, the increase in size of the clutch device and the increase in consumption power due to such a countermeasure can be suppressed.

Although the clutch device of the present invention has been described regarding the above embodiment, the present invention is not restricted to the above-described embodiment, but may be carried out in a variety of embodiments within a range not departing from the spirit of the invention. For example, a modification described below is possible.

(1) In the above embodiment, a case where the control cam 41 is arranged on the rotating member 2 such that it is capable of moving relative thereto and incapable of rotating relative thereto has been described. However, the present invention is not restricted to this example, but the control cam may be arranged on the rotating member such that it is incapable of moving relative thereto and incapable of rotating relative thereto. In summary, an indispensable condition of the present invention is just that the control cam is incapable of rotating relative to the rotating member.

(2) Although in the above embodiment, a case where the clutch device is an electromagnetic clutch using electromagnetic force has been described, the present invention is not restricted to this example, but the present invention may be applied to a clutch device using other locking force, for example, oil pressure or water pressure.

(3) Although in the above embodiment, a case where the clutch device of present invention functions as a braking device for braking the rotating member 2 has been described, the present invention is not restricted to this example, but the clutch device of the present invention may be made to function as a drive force transmission device for transmitting drive torque between a pair of the rotating members.

What is claimed is:

1. A clutch device comprising:
a clutch mechanism including a friction engagement member capable of rotating relative to a rotating member and a clutch member that is supplied with restoration force in a direction in which the clutch member departs from the friction engagement member by a restoration spring; and
a cam mechanism including a cam member incapable of rotating relative to the rotating member; and a cam follower capable of rolling on a cam surface that exists between the cam member and the clutch member, the cam member and the clutch mechanism being arranged in a row along a rotation axis line of the rotating member, and the cam mechanism being configured so that a cam angle of the cam surface is set to an angle that makes torque applied to the clutch member due to reaction force accompanied by friction engagement with the friction engagement member larger than torque applied to the clutch member by thrust force caused by an activation of the cam mechanism,
the cam mechanism is configured so that the cam angle is set to an angle that satisfies μm×rm×F<F×rc×(sin θ−μc cos θ)/(cos θ+μc sin θ), where the thrust force and the reaction force are F, the coefficient of static friction of the clutch member to a friction surface of the friction engagement member is μm, the coefficient of rolling friction of the cam follower to the clutch member is μc, the radius of an equivalent friction circle of the clutch member is rm, the radius of an action circle of the cam follower is rc, and the cam angle is θ.

2. The clutch device according to claim 1, wherein
the cam mechanism is configured so that the cam angle is set to an angle that satisfies $0<\mu c \leq 0.02$.

3. The clutch device according to claim 1, wherein
the friction engagement member is a coil housing;
the clutch member is an armature; and
the clutch mechanism is an output mechanism including the coil housing, an electromagnetic coil accommodated in the coil housing, and the armature.

4. The clutch device according to claim 3, wherein the angle $\theta$ is set so that the armature releases when the electromagnetic coil is not energized.

* * * * *